Oct. 23, 1956   A. G. SPEAR, JR., ET AL   2,768,025
RETRACTIBLE RIGID AUTOMOBILE TOP
Filed Nov. 26, 1952   5 Sheets-Sheet 1

A. G. SPEAR, JR.
J. A. HUGGINS
INVENTORS

BY
E. C. McRae
J. R. Faulkner
J. H. Oster
ATTORNEYS

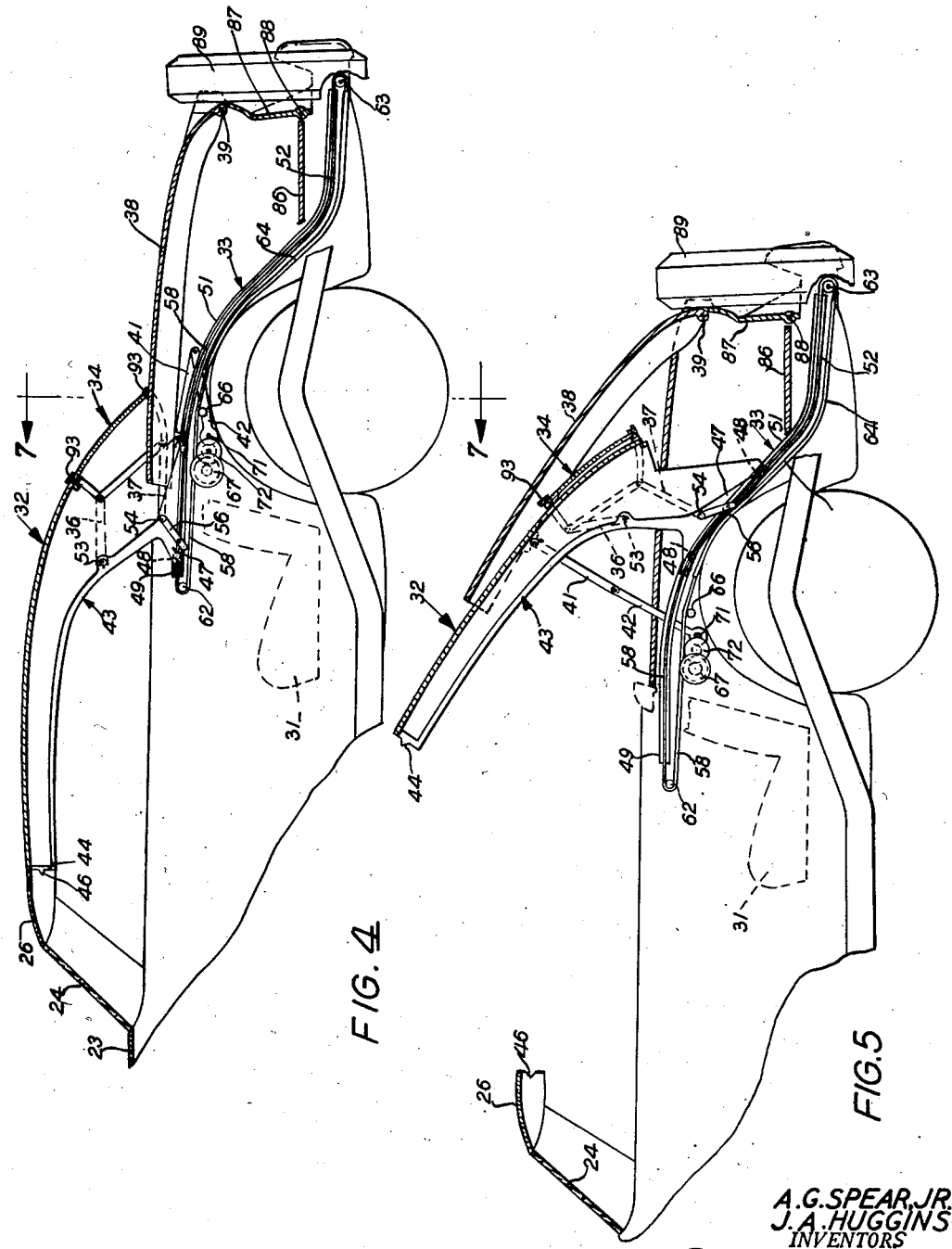

Oct. 23, 1956  A. G. SPEAR, JR., ET AL  2,768,025
RETRACTIBLE RIGID AUTOMOBILE TOP
Filed Nov. 26, 1952  5 Sheets-Sheet 3
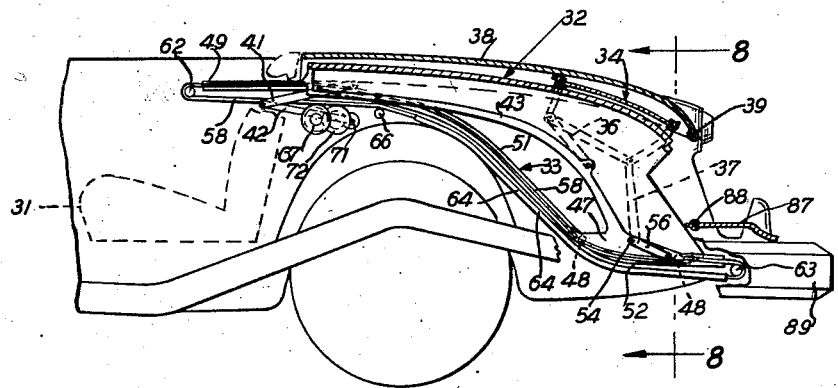
FIG. 6
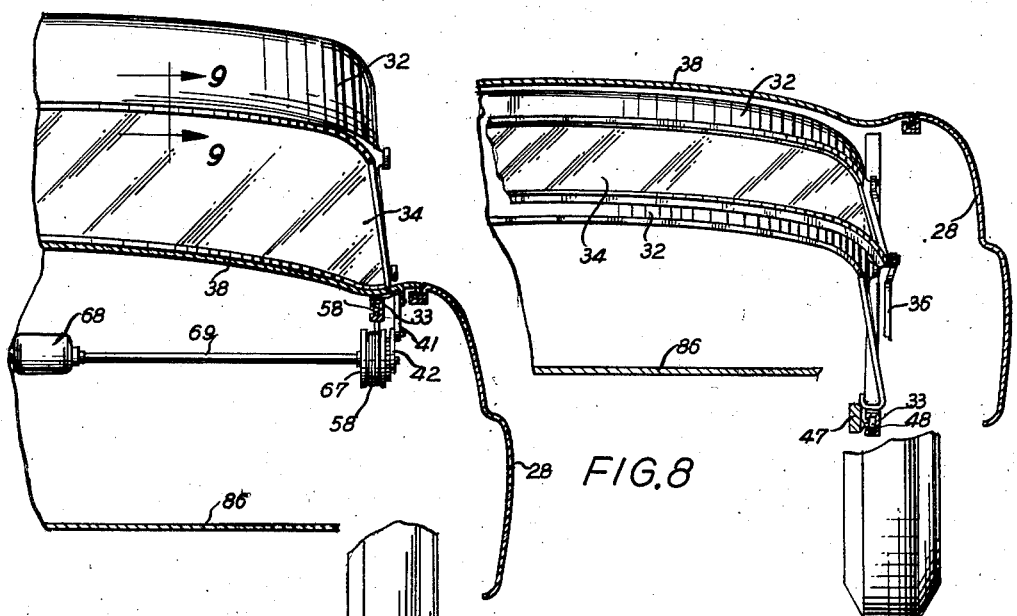
FIG. 7  FIG. 8
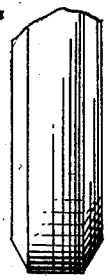
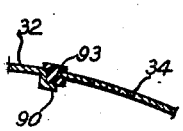
FIG. 9
A. G. SPEAR, JR.
J. A. HUGGINS
INVENTORS
BY E. C. McRae
J. R. Faulkner
J. H. Oster
ATTORNEYS

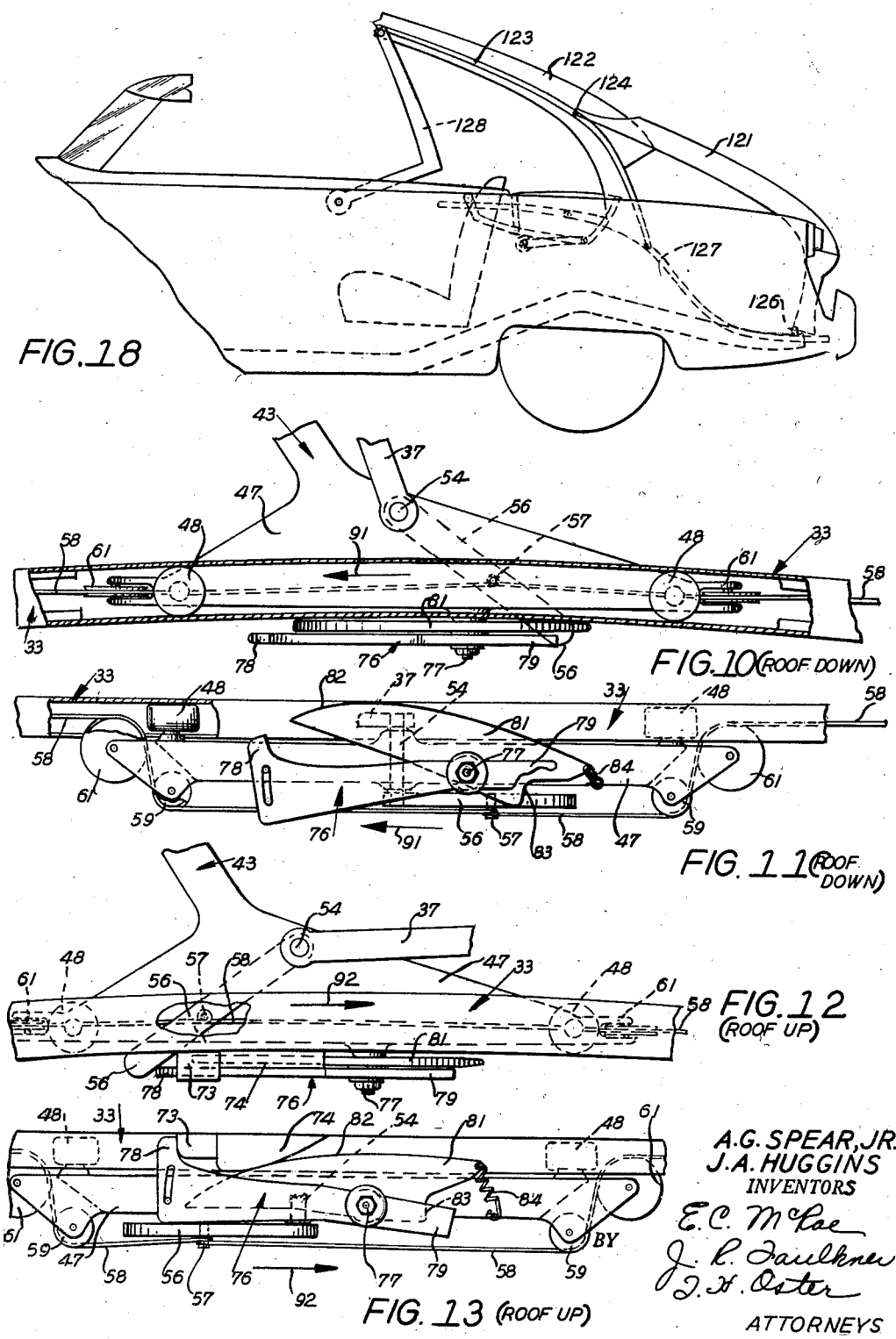

Oct. 23, 1956  A. G. SPEAR, JR., ET AL  2,768,025
RETRACTIBLE RIGID AUTOMOBILE TOP
Filed Nov. 26, 1952

A. G. SPEAR, JR.
J. A. HUGGINS
INVENTORS

ATTORNEYS

United States Patent Office 2,768,025
Patented Oct. 23, 1956

2,768,025

RETRACTIBLE RIGID AUTOMOBILE TOP

Adrian G. Spear, Jr., Southfield Township, Oakland County, and James A. Huggins, Detroit, Mich., assignors to Ford Motor Company, Dearborn, Mich., a corporation of Delaware Application November 26, 1952, Serial No. 322,604

8 Claims. (Cl. 296—117)

This invention relates generally to motor vehicle bodies, and has particular reference to a motor vehicle body having a retractable rigid roof.

An object of the present invention is to provide a motor vehicle body having a rigid roof which may be readily lowered and stored within or upon the vehicle body. The invention contemplates a body of the currently popular hard top convertible type yet in which the top may be bodily moved from its raised position to a lowered position in which it is stored beneath the rear deck of the vehicle. Means are provided for guiding the top as a unit in a rearward and downward direction to a location immediately beneath the deck lid. Simultaneously with the rearward movement of the top, the deck lid is automatically raised to provide clearance for the entrance of the roof. In addition, a separable rear window is provided beneath the rearward edge of the roof and the upper surface of the deck lid, and means are provided for mounting the separable rear window in such manner as to be shiftable to a stored position in which it does not interfere with the storing of the roof proper. A further object of the invention is to provide structure of the type briefly discussed above in which the movements of the roof, rear window, and deck lid are coordinated in timed relationship to provide automatic operation thereof between the operative and the stored positions of the roof and window. Means are provided for automatically effecting such movements in the proper timed relationship automatically under the actuation of a single power source.

Other objects and advantages will be made more apparent as this description proceeds, particularly when considered in connection with the accompanying drawings, wherein:

Figure 4 is a fragmentary enlarged semidiagrammatical view of a portion of the vehicle shown in Figure 1, being a vertical cross sectional view taken on the longitudinal center line of the vehicle.

Figure 5 is a view similar to Figure 4 but showing the top in its partially lowered position corresponding to Figure 2.

Figure 6 is a view similar to Figures 4 and 5 but showing the top in its lowered position corresponding to Figure 3.

Figure 7 is an enlarged fragmentary cross sectional view taken on the plane indicated by the line 7—7 of Figure 4.

Figure 8 is an enlarged fragmentary cross sectional view taken on the plane indicated by the line 8—8 of Figure 6.

Figure 9 is a cross sectional view taken on the plane indicated by the line 9—9 of Figure 7.

Figure 10 is an enlarged side elevational view, partly broken away and in section, of cooperating portions of the roof track and control mechanism associated therewith, with the parts being shown in the position they assume with the roof lowered into its stored position.

Figure 11 is a bottom plan view, partly broken away and in section, of the structure shown in Figure 10, also with the roof in its lowered position.

Figure 12 is a side elevational view similar to Figure 10 but showing the parts in the position they assume with the roof in its raised or operative position.

Figure 13 is a bottom plan view of the structure shown in Figure 12.

Figure 18 is a side elevational view showing still another modification.

Figure 1:
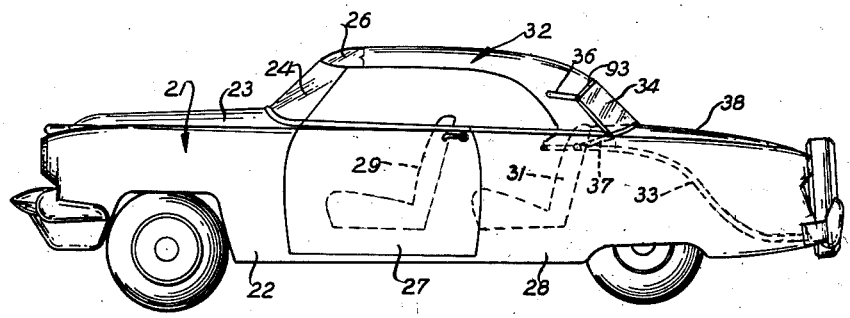
Figure 1 is a side elevational view of a motor vehicle incorporating the present invention, with the roof in its raised or operative position.
Figure 2:
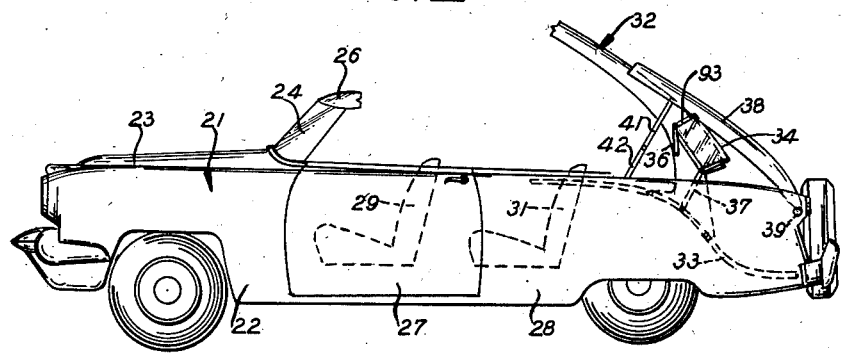
Figure 2 is a side elevational view similar to Figure 1, but showing the roof in a partially lowered position.
Figure 3:
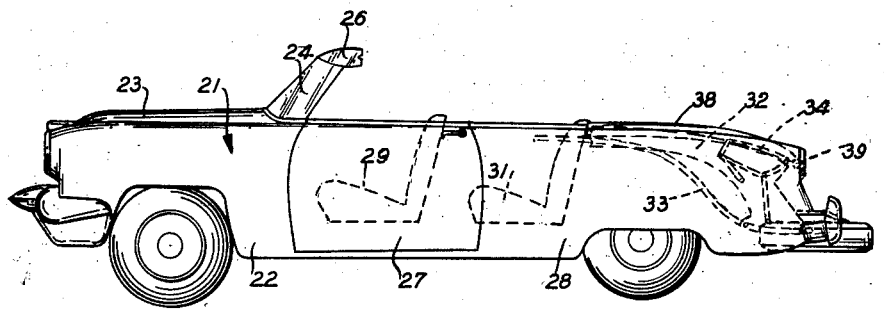
Figure 3 is a view similar to Figures 1 and 2, but showing the roof in its stored position beneath the deck lid.

Referring now to the drawings, and particularly to Figures 1, 2 and 3, the reference character 21 indicates generally a motor vehicle body incorporating the present invention. The body is somewhat similar to a convertible in that the top is retractable and is stored within the body, but is also similar to the so called hard top in that the roof is a rigid steel unitary structure.

The body includes front fenders 22, a hood 23, a self supporting windshield 24, and a fixed windshield header 26. The side doors 27 and the rear quarter panels 28 are conventional, as are the front and rear seats 29 and 31 respectively.

The roof 32, however, varies from the conventional convertible or hard top in that it is a rigid one-piece steel roof supported upon and bodily movable along a pair of longitudinally extending tracks 33 located inside the quarter panels 28 at opposite sides of the vehicle body. The tracks 33 support and guide the roof rearwardly and downwardly from its raised operative position as shown in Figure 1 to its lowered stored position as shown in Figure 3. The rear window 34 is movably mounted upon the roof 32 by means of upper and lower links 36 and 37 on opposite sides of the vehicle, permitting the rear window to be swung upwardly in overlapping relationship to the rearward portion of the roof 32, as shown in Figures 2 and 3 and described more in detail hereinafter.

To permit the roof 32 to be stored out of sight within the luggage compartment of the vehicle the rear deck 38 is pivotally connected to the vehicle body at the rearward portion thereof for swinging movement about the transversely extending axis of the hinges 39. A pair of toggle arms 41 and 42, best seen in Figure 2, raise the deck lid 38 as the roof 32 is being moved rearwardly along the track 33 to provide clearance beneath the deck lid for the passage of the roof from its operative to its stored position, and vice versa.

Reference is now made to Figures 4 to 14 inclusive for a more detailed description of the structure briefly described above. Since the mechanism at each side of the body is identical, only that at one side will be described in detail. Figure 4 is a longitudinal vertical cross sectional view taken substantially along the center line of the vehicle and looking outwardly toward the right side thereof, and showing in semidiagrammatical fashion the mechanism for controlling the movement of the roof 32, rear window 34 and deck lid 38. Each side of the steel roof 32 is provided with a supporting member 43 forming a reinforcement for the edge thereof. The reinforcement 43 extends the entire length of the lower edge of the roof and at its forward end is provided with a wedge shaped guide 44 arranged to interlock with a corresponding V-shaped notch 46 in the windshield header 26 to properly align the roof and the header when the roof is raised. The supporting member 43 at each side of the roof is formed at its rearward extremity into an elongated trolley 47 carrying at opposite ends thereof a pair of rollers 48 (Figures 10 and 11). The rollers 48 are received within the channel shaped track 33 and permit fore and aft movement of the roof in a predetermined path governed by the configuration of the track 33.

The track 33 has a substantially horizontal forward portion 49, an intermediate rearwardly and downwardly inclined portion 51 and a rearward portion 52 extending substantially horizontally. This track configuration results in horizontal disposition of the roof both in its raised and its lowered positions and tilts the roof during the intermediate portion of its travel to facilitate its movement into the luggage compartment beneath the deck lid 38.

If desired, the rear window 34 can be made a fixed permanent part of the roof structure, but to permit the overall length of the roof to be shortened so that it can be stored in a smaller space, the rear window 34 is here shown as a separable unit pivotally connected to the supporting member 43 of the roof by upper and lower links 36 and 37 respectively. The links 36 and 37 are pivotally connected to the supporting member 43 for rotation about pivot pins 53 and 54 vertically spaced from each other in such manner that the links are generally horizontal and parallel to each other in the raised position of the roof with the rear window in its operative location.

Power driven means are provided for operating the roof 32 and the rear window 34 in timed relationship to each other. Upon reference to Figures 10 and 11, as well as Figure 4, it will be noted that the pivotal connection 54 between the lower link 37 and the supporting member 43 for the roof comprises a laterally extending shaft journaled in the trolley portion 47 of the roof supporting member and protruding beyond the opposite side thereof. The lower link 37 is connected to the outer end of the shaft 54, and an actuating lever 56 is secured to the inner end of the shaft.

Intermediate its ends the actuating lever 56 carries a stud 57 to which is secured an endless driving cable 58. The driving cable 58 is reeved over sheaves 59 and 61, Figure 11, and extends longitudinally within the channel shaped track 33. Sheaves 62 and 63 are pivotally mounted upon the vehicle body at the forward and rearward ends respectively of the track 33, Figure 4, and the cable 58 is reeved over these sheaves. Adjacent the inclined intermediate portion 51 and the horizontal rearward portion 52 of the track 33 the cable 58 is guided within a tube 64 conforming to the configuration of the track. Forwardly of the forward end of the guide tube 64, the cable is guided by means of a guide 66 and forwardly of this pulley the cable is wound around a driving drum 67.

As best seen in Figure 7, the drum 67 is driven by means of an electric motor 68 mounted upon the vehicle body in a central location and having flexible drive shafts 69 extending in opposite directions therefrom to drive the drums and operate the endless cables 58.

Means are also provided for raising the forward portion of the deck lid 38 to provide clearance therebeneath for the passage of the roof 32. As previously mentioned, a pair of toggle links 41 and 42 are utilized for this purpose, the lower toggle link 42 being pivotally mounted upon the body at 71 and rotated by means of a gear train 72 from the shaft 69 of the drum 67.

Attention is invited to Figures 10 to 13 inclusive for a description of the control mechanism assuring the proper timed operation of the roof 32 and the rear window 34. As best seen in Figures 12 and 13, a striker 73 is permanently mounted on the side of the track 33, and immediately rearwardly thereof a cam release plate 74 is secured to the track. The striker plate 73 is adapted to cooperate with a pivoted latch 76 mounted for pivotal movement about a pivot shaft 77 carried by the trolley portion 47 of the roof supporting member 43. The latch 76 is provided with a hook-shaped latching flange 78 for cooperation with the striker plate 73. The latch 76 also has an inclined actuating arm portion 79 adapted to be engaged by the actuating lever 56 to which the cable 58 is attached to swing the latch member 76 in a counterclockwise direction (as viewed in Figure 13) to release the latch from the striker.

Also pivotally mounted upon the shaft 77 is a pawl 81 having a cam surface 82 on its upper edge and locking portion 83 adjacent its rearward portion. A coil spring 84 normally holds the pawl 81 in the position shown in Figure 11, in which position the locking portion 83 of the pawl blocks rotative movement of the actuating lever 56. When in this blocking position, operation of the cable 58 by the drum 67 in the direction of the arrow 91 causes the lever 56 to apply a direct force to the pawl 81, and since the latter is mounted upon the trolley portion 47 of the roof supporting member it follows that the roof is moved longitudinally along the track 33.

Adjacent the rear window 34, the roof 32 is formed with an inwardly offset marginal flange 90 which cooperates with a weatherstrip 93 attached to the outer periphery of the rear window 34 to form a weather tight seal therebetween and yet to enable the rear window to be readily raised and swung to its stored position above the roof.

Operation

The roof lowering cycle will first be described. With the roof 32, rear window 34 and deck lid 38 in the positions shown in Figure 4, the control mechanism therefor is as shown in Figures 12 and 13. It will be noted that the pawl 81 is in engagement with the cam release plate 74 and is held in an operative position. At the same time, the latch member 76 is in locking engagement with the striker plate 73 to lock the roof 32 in its fully raised position and prevent rearward movement of the trolley portion 47 of the roof supporting member 43 along the track 33.

To lower the roof, suitable conventional controls (not shown) are actuated to operate the electric motor 68 and drive the drum 67 in a counterclockwise direction as seen in Figure 4. This moves the endless cable 58 in a clockwise direction around its end sheaves 62 and 63 and, because of the connection 57 between the cable and the actuating lever 56, the latter is swung in a counterclockwise direction about its pivot shaft 54. The actuating lever 56 thereby actuates the lower link 37 of the rear window 34, swinging the window from its position as shown in Figure 4 to a position overlapping the rearward portion of the roof 32. The links 36 and 37 are so designed that the rear window 34 is swung to the position shown in Figure 5 in which it is arranged on top of and immediately adjacent the upper surface of the rearward portion of the roof.

As the rear window 34 reaches its upper position, the actuating lever 56 is swung to a position in which it engages the rear arm 79 of the latch member 76 causing the latter to be rotated in a counterclockwise direction (Figure 13) about its pivot 77, thereby releasing the locking portion 78 of the latch member from the striker plate 73 and releasing the roof 32 for rearward movement.

Since the rear window 34 cannot be moved any further, continued movement of the cable 58 in the direction of the arrow 92 (Figures 12 and 13) is effective to move the roof rearwardly, the force of the cable being applied through the lever 56 and its pivot shaft 54 to the trolley portion 47 of the roof supporting member 43.

Simultaneously with the raising of the rearward window 34 and the operation of the roof 32, the deck lid 38 is raised by the toggle links 41 and 42 through the actuation of the gear train 72 by the drum shaft 69. The deck lid 38 is thus raised to the position shown in Figure 5 in which sufficient clearance is provided beneath the deck lid to enable the roof 32 to be bodily moved rearwardly along the tracks 33 to its stored position within the luggage compartment of the vehicle body. During this travel, the rear window 34 is of course carried with the roof structure.

As the roof 32 is moved from its intermediate position shown in Figure 5 to its stored position shown in Figure 6, the deck lid 38 is closed by reason of the reverse movement of the toggle links 41 and 42 to a forward collapsed position. In the lowered or stored position of the roof the trolley 47 is supported upon the rearward horizontal portion 52 of the track 33 so that the roof is held in a horizontal position directly beneath the deck lid 38. Since the rear window 34 is stored on top of the roof 32 it will be apparent that the rearward portion of the roof is open to provide space for luggage storage between the roof and the floor 86.

Figure 8 is a rearward view showing the storage of the roof 32 and the rear window 34 beneath the deck lid 38 and illustrating the luggage space beneath the roof. Access ot this luggage space is obtained by means of a tail gate 87, best seen in Figures 4 and 6. The tail gate 87 is mounted for swinging movement about a horizontal pivotal axis 88 substantially in alignment with the luggage compartment floor 86. For convenience and appearance the tail gate 88 supports the spare wheel 89 and when the tail gate is lowered to the position shown in Figure 6 the spare wheel is disposed generally horizontally. Convenient access is thus available to the luggage compartment for the storage of suitcases and other items of luggage and the like. If desired, of course, the spare wheel can be stored inside the luggage compartment rather than being attached to the tail gate.

To raise the roof from the stored position shown in Figure 6 to the raised operative position shown in Figure 4 it is only necessary to reverse the electric motor 68 and thereby reverse the direction of rotation of the endless cable 58. The cable 58 is thus moved in the direction of the arrow 91 (Figures 10 and 11) and the force of the cable is applied through the stud 57 to the actuating lever 56 to swing the latter in a clockwise direction about its pivotal connection 54 to the trolley 47 of the roof supporting member 43. As seen in Figure 11, rotative movement of the actuating lever 56 is blocked by the blocking portion 83 of the pawl 81 so that the lever 56 cannot immediately be rotated to return the rear window 34 to its operative position in the window opening of the roof. Consequently, the force of the cable is applied through the lever 56 and the pivotal mounting 54 to the trolley 47 of the roof, and the roof and rear window are bodily moved forwardly and upwardly along the track 33. Simultaneously, the toggle links 41 and 42 raise the deck lid 38 to provide clearance for the roof and, after the roof has been raised, the toggle links return the deck lid to the position as shown in Figure 4.

As the roof approaches the end of its forward travel, the arcuate cam surface 82 of the pawl 81 engages the cam release plate 74 mounted upon the forward portion of the track, and swings the pawl in a counterclockwise direction to release the actuating lever 56 from the blocking portion 83 of the pawl. Subsequent movement of the cable is then effective to swing the actuating lever 56 in a clockwise direction and, through the links 36 and 37, to return the rear window 34 to its operative position in the window opening of the roof with the weatherstrip 93 around the periphery of the window in sealing engagement with the adjacent edges of the roof panel and with upper surface of the deck lid. The final swinging movement of the actuating lever 56 engages the forward portion of the latch member 76 to swing it in a clockwise direction so that the hook-shaped end 78 thereof is engaged with the striker plate 73 to lock the roof in its raised position. The engagement between the wedge-shaped projection 44 at the forward end of the roof supporting structure with the V-shaped notch 46 in the windshield header aligns and interlocks the roof to the header.

It will of course be understood that conventional limit switches (not shown) are utilized to stop the electric motor 68 when the roof has reached either extremity of its travel.

Although the embodiment of the invention described above utilizes a single power source for actuating the roof, rear window, and deck lid in timed relation, it is within the contemplation of the invention to utilize separate power sources for each of these structures and to operate them in proper sequence by means of conventional electrical timing mechanisms.

*Modifications*

Figure 14:
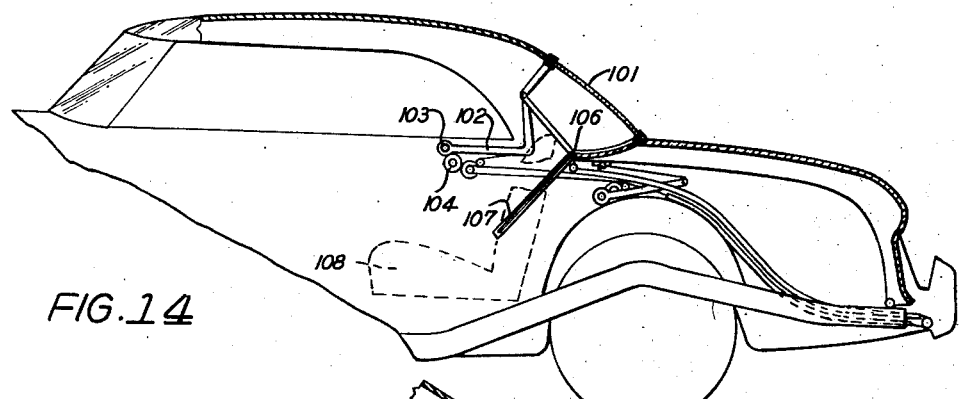
Figure 14 is a fragmentary cross sectional view similar to Figure 4 but showing a modification.
Figure 15:
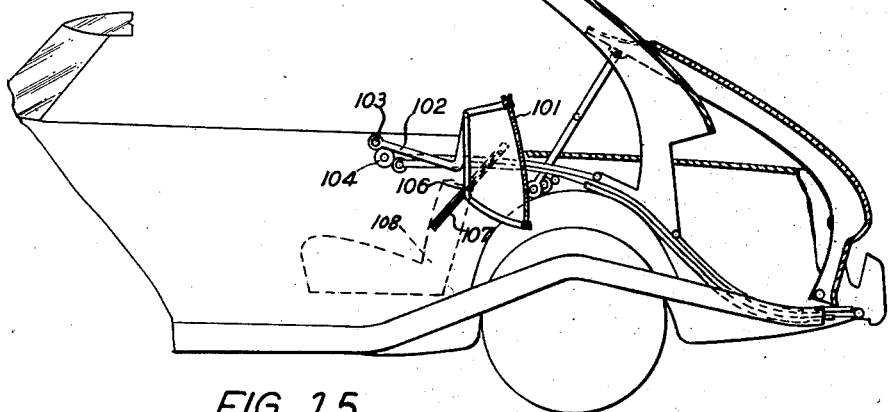
Figure 15 is a cross sectional view similar to Figure 14 but with the roof in a partially lowered condition.
Figure 16:
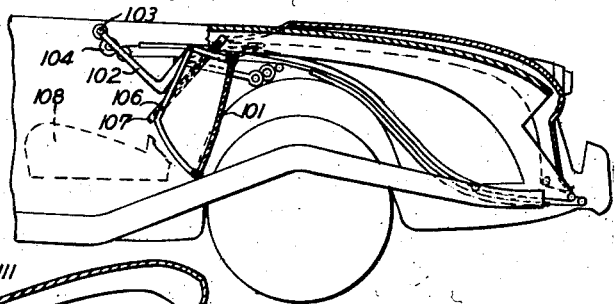
Figure 16 is a cross sectional view similar to Figures 14 and 15 but showing the roof in its completely lowered position stored beneath the deck lid.

A modification of the invention is shown in Figures 14, 15 and 16 which illustrate respectively the raised, intermediate and lowered positions of the roof. This modification differs primarily in the supporting and storing of the rear window 101. In this instance, the window 101 is supported at its upper corners by means of L-shaped levers 102 pivotally mounted at 103 to the vehicle body and driven from the drum 104 by means of suitable gearing (not shown). The lower corners of the rear window 101 are provided with rollers 106 slidably received within the diagonally mounted guideway 107 secured to the inner side of the vehicle body. As the power driven drum 104 is operated, the actuating levers 102 swing the rear window 101 rearwardly from the position shown in Figure 14 to the stored position shown in Figure 16. It will be seen that the window is thus stored behind the rear seat 108 with the path of travel thereof being determined by the actuating levers 102 and the guideway 107. During the raising operation of the roof the final step is to restore the rear window 101 to its operative position adjacent the window opening in the roof.

Figure 17:
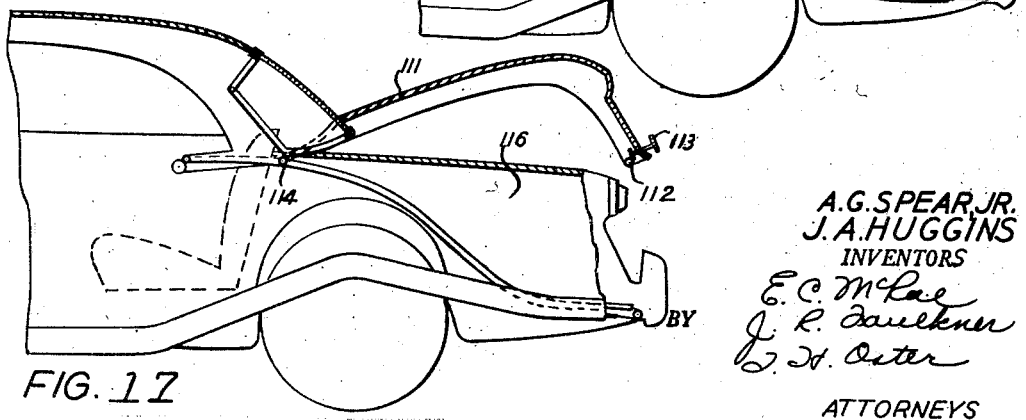
Figure 17 is a cross sectional view showing another modification.

Figure 17 illustrates a modification in which the deck lid 111 is provided with pivotal mountings at its forward and rearward ends. The pivotal connections 112 at the lower rearward portion of the deck lid are retractable by means of a conventional release mechanism shown diagrammatically at 113 so that the deck lid may be raised about its forward pivotal axis 114 to provide access to the luggage compartment 116 of the vehicle both when the top is raised and also when it is in its lowered position.

Another modification of the invention is shown in Figure 18 in which the principal variation is the manner of raising the deck lid 121 to provide clearance therebeneath for the travel of the roof 122 to its stored position. The roof 122 is provided at each side thereof with tracks 123 which if desired may be integrally formed with the conventional drip molding provided along the edges of the roof. The tracks 123 form guideways for rollers 124 mounted at the forward extremities of the side portions of the deck lid 121 so that the deck lid is automatically raised about its lower pivotal axis 126 when the top is bodily moved rearwardly along its track 127. In this instance, an actuating lever 128 is utilized to support and swing the forward edge of the roof rearwardly.

If desired, of course, the mechanisms discussed above may be manually actuated rather than being power driven as shown.

It will be understood that the invention is not to be limited to the exact construction shown and described, but that various changes and modifications may be made without departing from the spirit and scope of the invention, as defined in the appended claims.

What is claimed is:

1. In a motor vehicle body, a retractable rigid roof for a body, a deck lid pivotally mounted at its rearward end upon said vehicle body, a pair of tracks secured to said body at opposite sides thereof beneath said deck lid, each of said tracks being inclined downwardly in a rearward direction, supporting members for said roof at opposite sides thereof and adjacent the rearward portion thereof, a pair of longitudinally spaced rollers pivotally mounted upon each of said supporting members and engageable with the adjacent tracks to support and guide the roof in a predetermined longitudinal path, a rear window for said vehicle normally positioned between the rearward edge of said roof and the upper portion of said deck lid, weatherstrip means around the periphery of said rear window for sealing engagement with said roof and deck lid, a pair of vertically spaced links at each side of said vehicle body for movably supporting said rear window, each of said links being pivotally connected at its rearward end to said window and at its forward end to the adjacent supporting member for said roof, an arm for actuating one of said links and extending downwardly adjacent one of said tracks, an endless cable at each side of said vehicle body extending generally along the adjacent track and secured at one point to said actuating arm, power means for actuating said endless cable selectively in either direction, operation of said endless cable by said power means when the roof is in its raised operative position being effective to swing said rear window from its position between said roof and deck lid to a position overlapping and lying adjacent the upper surface of said roof, and a latch normally holding said roof locked in its raised position, said latch being engaged by said actuating arm and released from its locking position after said arm has been moved by said power means sufficient to raise the rear window to its aforesaid location above said roof.

2. The structure defined by claim 1 which is further characterized in that a pawl is mounted upon each of the supporting members for the roof and is spring urged to a position engaging the adjacent actuating arm for the rear window and locking it in the position holding the rear window adjacent the upper surface of said roof for movement therewith as a unit, and a cam engageable with said pawl when the roof and its supporting members have been moved to their forward fully raised position to release said pawl from locking engagement with said actuating arm and permit rotation of said actuating arm by subsequent movement of said endless cable to lower said rear window to its operative position between the rearward edge of said roof and the upper portion of said deck lid.

3. In a motor vehicle body, a retractible rigid roof for said body, a deck lid pivotally mounted at its rearward end upon said vehicle body, a pair of tracks secured to said body at opposite sides thereof beneath said deck lid, rollers mounted upon the rearward portion of said roof and engaging said tracks to support and guide the roof in a predetermined longitudinal path, a window located between the rearward edge of said roof and the upper portion of said deck lid, weatherstrip means carried by said window having sealing engagement with said roof and said deck lid, a pair of links pivotally connecting each side of said window to the adjacent portion of said roof and permitting swinging movement of said window from its normal position between the rearward edge of the roof and the upper portion of the deck lid to a position overlying the upper surface of said roof, and means for raising the forward end of said deck lid in timed relationship to the rearward movement of said roof along said tracks to provide clearance beneath said deck lid for the passage of said roof from its operative or up position to its stored or down position beneath the deck lid.

4. In a motor vehicle body, a retractible rigid roof for said body, a deck lid pivotally mounted at its rearward end upon said vehicle body, a pair of longitudinally extending tracks secured to said body at opposite sides thereof beneath said deck lid, said tracks sloping downwardly from their forward to their rearward portions, a pair of longitudinally spaced rollers mounted upon the rearward portion of said roof at opposite sides thereof and engaging said tracks to support and guide the roof in a predetermined longitudinal path, an endless power driven element adjacent each side of said vehicle body and engageable with the adjacent portion of said roof to selectively move said roof along said track between an elevated forward operative position and lowered rearward stored position, power driven means for elevating the forward end of said deck lid, means between said endless power driven element and said power driven elevating means to provide timed operation thereof to elevate the forward end of said deck lid and provide the necessary clearance for the roof as it is moved rearwardly to its stored position beneath said roof and to return the forward portion of said deck lid to its original lowered position when the deck lid is in its stored position, a rear window located normally between the rearward edge of said roof and the upper portion of said deck lid, a pair of links at each side of said vehicle body, each of said links having one end pivotally connected to said rear window and the other end pivotally connected to said vehicle roof, one of the links at each side of said body having a part operatively connected to the endless power driven element at that side of the body for actuation thereby in timed relation to the longitudinal movement of the roof and so arranged that initial movement of the endless element in a direction to move the roof rearwardly and downwardly swings said rear window about the pivotal connections of the links to the roof to a position overlying the rearward portion of said roof and closely adjacent thereto, and subsequent movement of the endless element in the same direction moves the roof and the rear window carried thereby rearwardly and downwardly towards their stored positions beneath said deck lid.

5. In a motor vehicle body, a retractible rigid roof for said body, said roof having an upper portion, rear side portions at opposite sides thereof, and a central open portion between said rear side portions, a deck lid pivotally mounted at its rearward end upon said vehicle body, means associated with the rear side portions of said vehicle roof to support and guide said roof in a predetermined and rearward and downward path, a transparent window moveably supported upon the rearward portion of said roof, means for moving said window from a position closing the rear central opening in said roof to a position adjacent the upper portion of said roof forwardly of said opening, and means for raising the forward end of said deck lid in timed relationship to the rearward and downward movement of said roof to provide clearance beneath said deck lid for the passage of said roof from its operative or up position to its stored or down position beneath the deck lid.

6. In a motor vehicle body, a retractible rigid roof for said body, said roof having a generally horizontally extending upper portion and generally vertically extending side portions adjacent the rearward part thereof, a pair of longitudinally spaced rollers mounted upon the lower portion of each of said roof side portions, a deck lid pivotally mounted at its rearward end upon said vehicle body, a longitudinally extending track secured to said body at each side thereof beneath said deck lid and in longitudinal alignment with the adjacent side portion of said vehicle roof, said pair of rollers on each of said roof side portions engaging the adjacent longitudinally aligned track to provide a cantilever support for said roof and forming the sole support for said roof during its retractile movement, means to keep said rollers engaged with said track, and means for raising the forward end of said deck lid in timed relationship to the rearward retractile movement of said roof along said tracks to provide clearance beneath said deck lid for the passage of said roof from its operative or up position to its stored or down position beneath the deck lid.

7. The structure defined by claim 6 which is further characterized in that said vehicle body is provided with a rear window located between the generally vertically extending side portions of the vehicle roof, weatherstrip means having sealing engagement between said roof and said window, and supporting means movably mounting said window upon said roof for movement of said window from its normal position to a position forwardly of its normal position and adjacent the upper portion of the vehicle roof.

8. In a motor vehicle having a retractable rigid top that improvement comprising a pair of guiding tracks laterally spaced and rearwardly of the raised top position in the vehicle body, a roof having track engaging members on either side and said members being located rearwardly of said roof, each side of said roof being supplied with two of said members spaced longitudinally of said vehicle and spaced to independently support said roof throughout its travel so that other roof supports are unnecessary, means to keep said members engaged with said track.

References Cited in the file of this patent

UNITED STATES PATENTS

| | | |
|---|---|---|
| 2,007,873 | Paulin | July 9, 1935 |
| 2,105,293 | Paulin | Jan. 11, 1938 |
| 2,215,363 | Rupple | Sept. 17, 1940 |
| 2,471,378 | Shilala | May 24, 1949 |
| 2,623,779 | Catell | Dec. 30, 1952 |

FOREIGN PATENTS

| | | |
|---|---|---|
| 493,260 | Belgium | May 2, 1950 |